United States Patent
Onodera et al.

(10) Patent No.: US 7,110,922 B2
(45) Date of Patent: Sep. 19, 2006

(54) ANALYTIC MODEL PREPARING APPARATUS AND STORAGE MEDIUM AND APPARATUS STORING ANALYTIC MODEL PREPARING PROGRAM

(75) Inventors: Makoto Onodera, Tsuchiura (JP); Ichiro Nishigaki, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 914 days.

(21) Appl. No.: 09/809,169

(22) Filed: Mar. 16, 2001

(65) Prior Publication Data
US 2001/0034590 A1   Oct. 25, 2001

(30) Foreign Application Priority Data
Mar. 17, 2000 (JP) .............................. 2000-081740

(51) Int. Cl.
*G06F 17/10* (2006.01)
*G06F 17/50* (2006.01)
(52) U.S. Cl. .................. 703/2; 703/1; 700/98; 345/420
(58) Field of Classification Search .............. 703/2; 364/578, 512; 345/419, 420; 700/98
See application file for complete search history.

(56) References Cited

U.S. PATENT DOCUMENTS

| | | | | |
|---|---|---|---|---|
| 5,831,875 A | * | 11/1998 | Hirata et al. | 703/7 |
| 6,224,249 B1 | * | 5/2001 | Ozawa et al. | 703/1 |
| 6,611,725 B1 | * | 8/2003 | Harrison et al. | 700/98 |
| 6,792,397 B1 | * | 9/2004 | Yoshikawa et al. | 703/2 |

FOREIGN PATENT DOCUMENTS

JP   A-6-259505   9/1994

OTHER PUBLICATIONS

Buhr et al., R.J.A. TimeBench: a CAD tool for real-time system design, ACM SIGAda Ada Letters, Proceedings of the 2nd International Symposium on environments and Tools for Ada, Sep. 1994, pp. 3-15.*
Lichten, L. The emerging technology of CAD/CAM, Proceedings of the 1984 annual conference of the ACM on the 5th generation challenge, Jan. 1984, pp. 236-241.*
Wang et al., Z. The design and fabrication of welded tubular joints using solid modelling techniques, proceedings on the 2nd ACM symposium on Solid modeling and applications, Jun. 1993, pp. 429-440.*

* cited by examiner

*Primary Examiner*—Russell Frejd
(74) *Attorney, Agent, or Firm*—Mattingly, Stanger, Malur & Brundidge, P.C.

(57) ABSTRACT

A joint portion of a profile model is retrieved from three-dimensional CAD model data and a joint target part, a joint position and a joint are registered as parts joint data. A joint model preparing object corresponding to the parts joint data is retrieved from a joint model preparing object database, a joint model preparing process registered in the joint model preparing object is executed to prepare a joint model, and the joint model and a neutral plane model are synthesized to prepare an analytic model.

4 Claims, 11 Drawing Sheets

DATA STRUCTUER OF PARTS JOINT DATA 107

STRUCTURE OF JOINT MODEL PREPARING OBJECT DATABASE 108

PROFILE MODEL

PROFILE ATTRIBUTE OF SCREW 506
SCREW OF Φ5

EXPLODED VIEW

NEUTRAL PLANE MODEL

ANALYTIC MODEL

PROFILE MODEL

EXPLODED VIEW

NEUTRAL PLANE MODEL

ANALYTIC MODEL

EXPLODED VIEW

PROFILE ATTRIBUTE OF PART 703 IS SCREW OF Φ5

PROFILE MODEL

PROFILE MODEL

EXPLODED VIEW

PROFILE ATTRIBUTE OF
PART 903 IS WELDING

901

904

902

903

PROFILE MODEL

PROFILE ATTRIBUTE OF PART 1003

ADHESIVE MATERIAL

PROFILE MODEL

ASSEMBLY JOINT DATA

JOINT TARGET PART : PARTS 1006, 1007

JOINT POSITION : PLANE 1008

JOINT MEANS : ADHERING

PROFILE MODEL

ANALYTIC MODEL PREPARING APPARATUS AND STORAGE MEDIUM AND APPARATUS STORING ANALYTIC MODEL PREPARING PROGRAM

BACKGROUND OF THE INVENTION

1. Field of the Invention

The present invention relates to a computer aided engineering (CAE) system for numerically simulating physical phenomena through a numerical analysis using a computer and more particularly, to an apparatus for preparing an analytic model used for numerical analysis from a profile model representing an object to be analyzed.

2. Description of the Related Art

For example, the following method has been known as a conventional method of preparing an analytic model from a profile model. In a profile model representing an object to be analyzed numerically, a laminate profile portion is designated. The designated profile element has planes connected thereto, of which ones having parallel geometric characteristics are extracted and planes parallel and closest to the extracted planes are specified as paired planes. Then, neutral planes are prepared in respect of the paired planes, thereby generating an analytic model. The conventional method is described in JP-A-6-259505.

In the conventional technique, for preparation of the analytic model, the profile model represented by a planar member having a thickness is replaced with planes having no thickness to prepare or generate the analytic model. Incidentally, the profile model contains various joint elements to form a product but in the conventional analytic method as above, the planar member is replaced with planes when the profile model is converted into the analytic model, with the result that the joint relation based on, for example, bolts and adhesion is lost. Accordingly, when an analysis is carried out with the analytic model, joint for putting members together is released and for example, behavior of the members under the application of a load differs from that of the product. Taking a plate-shaped member fixed to a base by adhering so as to stand uprightly thereon, for instance, adhesion is lost in the analytic model and according to the analytic model, when applied with a load in a direction parallel to the base, the plate-shaped member, which does not move essentially even under such a condition, is released from adhesion and is caused to move.

Therefore, with a view of analyzing the whole of product with high accuracy, it is necessary to prepare an analytic model properly expressing joint portions such as bolt joint or welding portions. Generally, after neutral planes (planes having no thickness) have been prepared from a profile model, a system user searches a joint portion by consulting a CAD diagram, a joint means is analytically modeled to provide a joint model which in turn is redefined at the joint portion of the analytic model in question, and the neutral plane model and the joint model are synthesized to prepare an analytic model.

In this analytic modeling of the profile model including the joint means, for the sake of preparing the analytic model including the joint means, the system user is required to search by himself or herself the joint portion and the joint model analytically modeling the joint means must be redefined, leading to a disadvantage that the more complicated the profile, the more the analytic model preparation becomes laborious and time-consuming.

SUMMARY OF THE INVENTION

An object of the present invention is to provide an analytic model preparing apparatus capable of efficiently preparing an analytic model of a profile model containing a joint portion and storage medium and apparatus that store an analytic model-preparing program.

In an analytic model preparing apparatus for preparing an analytic model for analysis from a CAD model, the above object can be accomplished by providing the function of searching a joint portion from data of the CAD model and emphatically displaying the joint portion.

In an analytic model preparing apparatus for preparing an analytic model for analysis from a CAD model, the above object can be accomplished by providing the function of searching a joint portion from data of the CAD model and preparing an analytic model corresponding to the joint portion.

In a storage medium storing an analytic model-preparing program for preparation of an analytic model for analysis from a CAD model, the above object can be accomplished by providing the function of searching a joint portion from data of the CAD model and delivering a signal for an emphatic display of the joint portion.

In a storage medium storing an analytic model-preparing program for preparation of an analytic model for analysis from a CAD model, the above object can be accomplished by providing the function of searching a joint portion from data of the CAD model and preparing an analytic model corresponding to the joint portion.

In a storage apparatus storing an analytic model-preparing program for preparation of an analytic model for analysis from a CAD model, the above object can be accomplished by providing the function of searching a joint portion from data of the CAD model and delivering a signal for an emphatic display of the joint portion.

In a storage apparatus storing an analytic model-preparing program for preparation of an analytic model for analysis from a CAD model, the above object can be accomplished by providing the function of searching a joint portion from data of the CAD model and preparing an analytic model corresponding to the joint portion.

In an apparatus for preparing an analytic model for numerical analysis in respect of a CAD model including a joint means such as welding, rivet, bolt, screw or adhering, the above object can be accomplished by providing means for inputting, as the CAD model, profile data and a profile attribute of an object to be analyzed, means for searching a part of laminate structure from the CAD model to prepare a neutral plane model, means for extracting a joint target part, a joint position and a joint means from the CAD model, means for registering the extracted joint target part, joint position and joint means as parts joint data, means for retrieving a joint model preparing object corresponding to the joint means registered in the parts joint data from a joint model preparing object database, means for executing a joint model preparing process registered in the joint model preparing object to prepare a joint model, and means for synthesizing the joint model and the neutral plane model to prepare an analytic model.

DETAILED DESCRIPTION OF THE EMBODIMENTS

Figure 1:
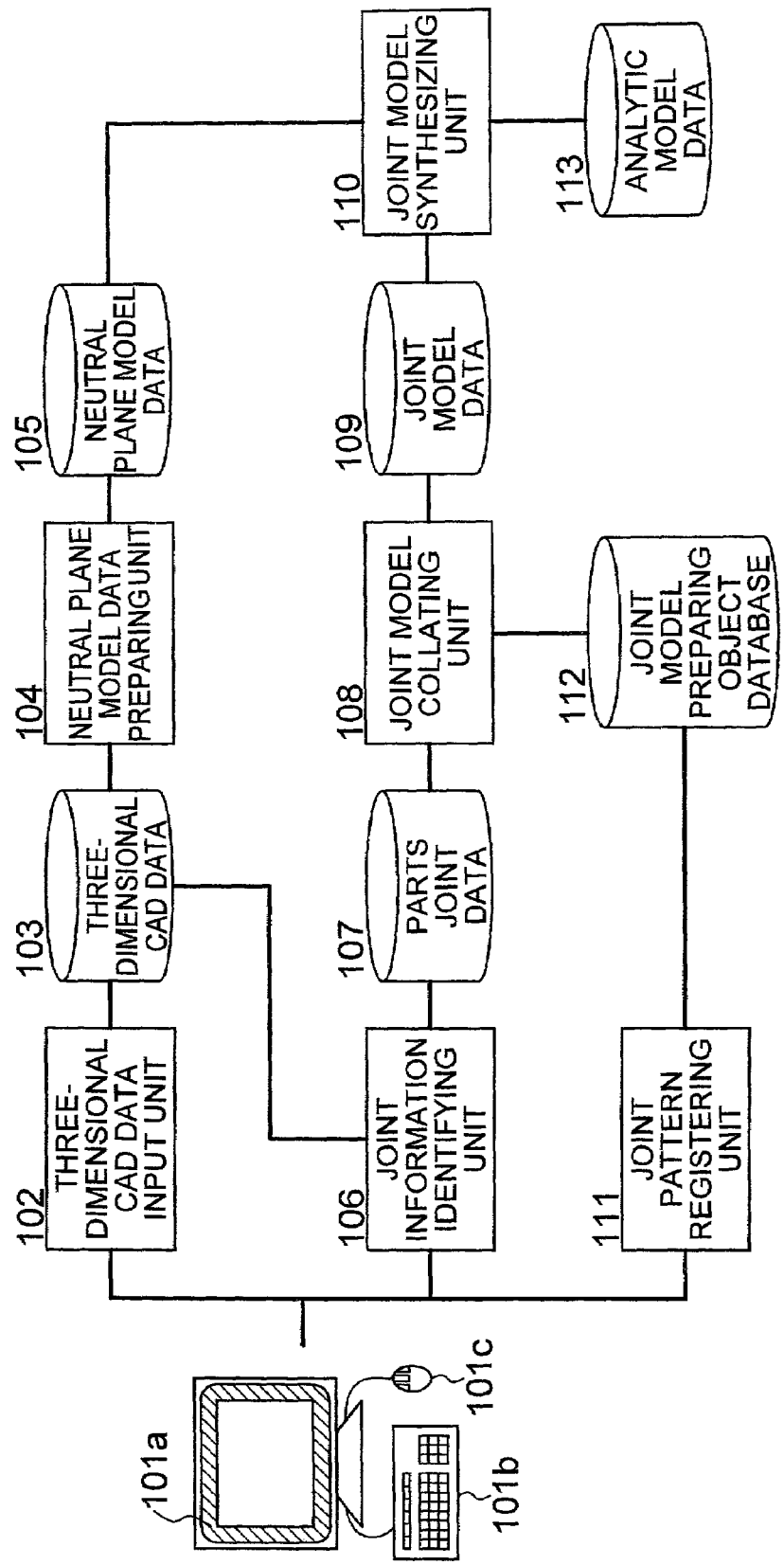
FIG. 1 is a diagram showing the overall construction of an embodiment of an analytic model preparing apparatus according to the invention.

Referring now to FIG. 1, an embodiment of an apparatus for preparation of an analytic model of a joint portion according to the invention will be described. Firstly, the construction of the present apparatus and processing procedures therein will be described. As shown in FIG. 1, the present apparatus comprises a three-dimensional CAD data input unit 102 having means for inputting a profile model of an object to be analyzed, a profile attribute such as name and type of the profile model and assembly joint information to an input/output unit 101 and registering the input data as three-dimensional CAD data 103, a neutral plane model preparing unit 104 having means for searching a part of laminate structure from the three-dimensional CAD data 103 and preparing neutral plane model data 105, a joint information identifying unit 106 having means for identifying a joint target part, a joint position and a joint means from the three-dimensional CAD data 103 to register them as parts joint data 107 and means for emphatically displaying the identified joint position on the input/output unit 101, a joint model collating unit 108 having means for retrieving a joint model preparing object corresponding to the parts joint data 107 from a joint model preparing object database 112 and means for preparing joint model data 109 in accordance with a joint model preparing procedure registered in the joint model preparing object, a joint model synthesizing unit 110 having means for synthesizing the joint model data 109 and the neutral plane model data 105 to generate analytic model data 113, and a joint pattern registering unit 111 having means for registering, as the joint model preparing object, the joint means, the joint model type, the joint model attribute and the joint model preparing procedure in the joint model preparing object database 112.

Figure 3A:
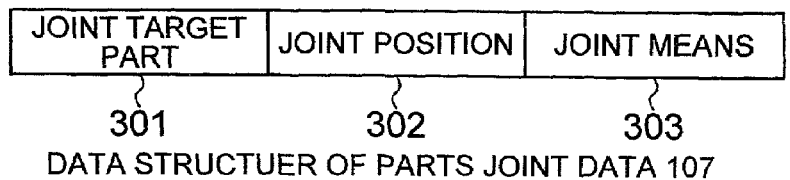
FIGS. 3A and 3B show an example of structure of parts joint data and an example of structure of joint model preparing object database.
Figure 3B:
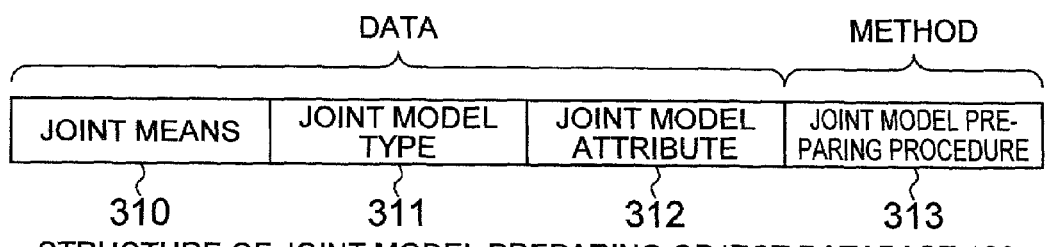

Referring to FIG. 3A, there is illustrated an example of data structure of the parts joint data 107, showing that the joint target object part, joint position and joint means which are identified by the joint information identifying unit 106 are registered at 301, 302 and 303, respectively. The object database referred to herein signifies a database for registering an object that is a combination of a processing procedure (method) with data concomitant therewith. Data and method in the joint model preparing object database 108 are structured as shown in FIG. 3B. Registered in joint means 310 are joint means representing objects subjected to joint model preparation. Registered in joint model type 311 are types of joint model such as tying joint, surface joint and beam element joint. Registered in joint model attribute 312 are attributes of the joint model (for example, when the joint model type is a beam element, geometrical dimensions, material data and the like of the beam element). Registered in joint model preparing procedure 313 are the processing procedures for preparation of the joint model.

Figure 2:
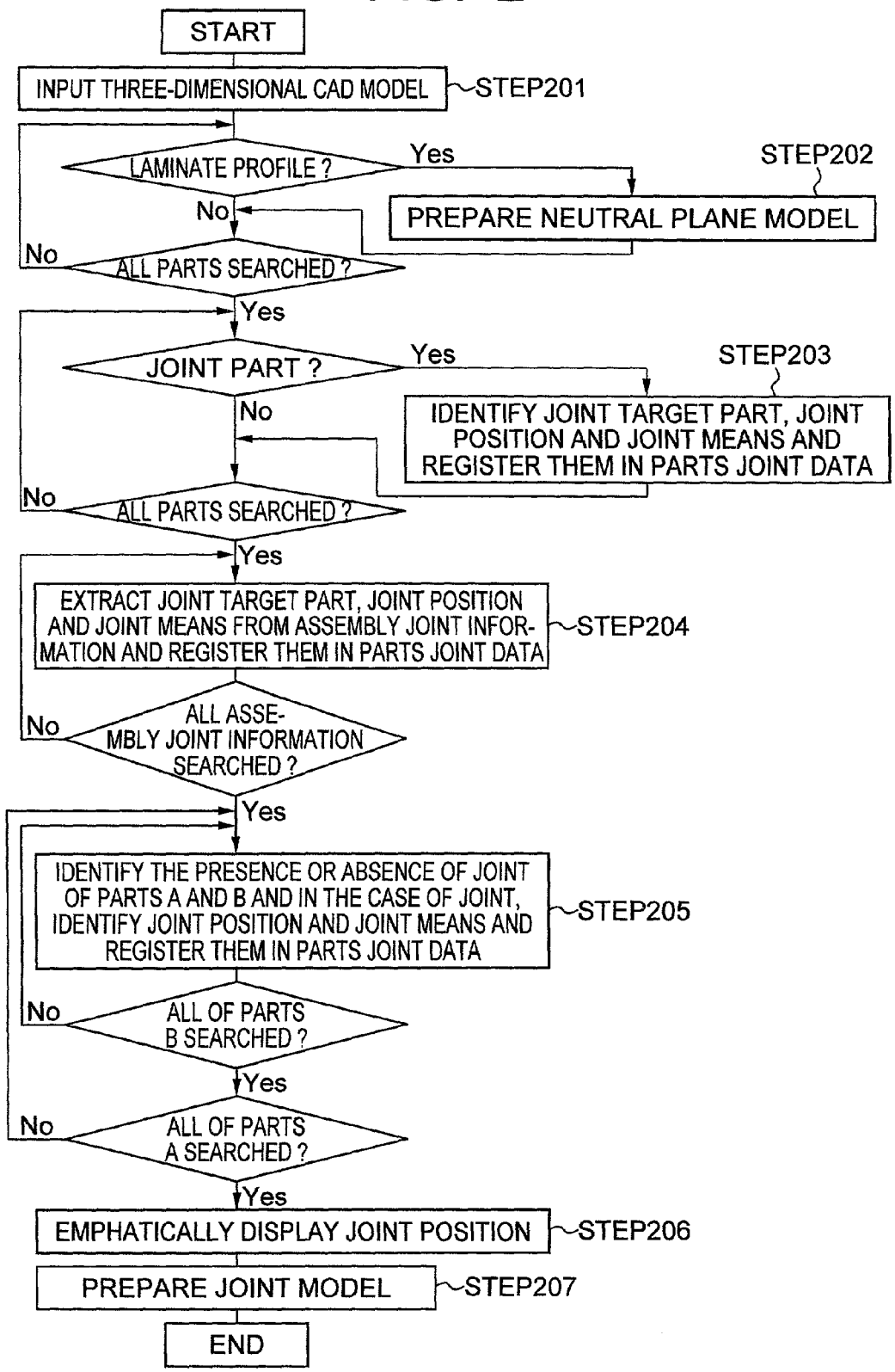
FIG. 2 is a flow chart showing the procedure for analytic model preparation according to the invention.

By applying, to the conventional analytic model preparing method, the joint information identifying unit 106 for identifying the joint target part, joint position and joint means from the three-dimensional CAD data 103 to register theme as parts joint data 107, the joint model collating unit 108 having means for retrieving a joint model preparing object corresponding to the parts joint data 107 from the joint model preparing object database 112 and means for preparing the joint model data 109 in accordance with a joint model preparing procedure registered in the joint model preparing object and the joint model synthesizing unit 110 for synthesizing the joint model data 109 and neutral plane model data 105 to generate the analytic model data 113, an analytic model including a joint portion can be prepared with high efficiency. An example of the analytic model preparing procedure according to the invention will be described in accordance with a flow chart shown in FIG. 2.

By using keyboard 101b and pointing device 101c of the input/output unit 101, the system user prepares/changes the analytic target profile, profile attribute such as name and type of the profile model and assembly joint information for individual constituent parts and registers them in the three-dimensional CAD model data in step 201 (three-dimensional CAD data input unit 102).

Since all parts constituting the profile model representing the analytic target are stored in the three-dimensional CAD data 103, a laminate structure is extracted from these parts to generate neutral plane model data 105 for analysis in step 202 (neutral plane model preparing unit 104). After all of the parts have been searched and all laminate profile parts have been searched, the program proceeds to the following step.

Subsequently, searching of the joint portion proceeds on the basis of an idea as below. More particularly, portions that can be recognized exactly as the joint portion by the computer are first searched. This aims at reducing the number of searching operations in the succeeding steps. For example, bolt, screw and rivet are registered as parts in the three-dimensional model data and they are not considered as being usable for other purposes than joint. Therefore, they are first searched and the joint target part (mated members to be jointed), joint means (bolt, screw and the like) and joint position (indicating which portion on the joint target part is the joint portion) are registered.

In this phase, welding or adhering, for example, is not clearly recognized as joint means and the three-dimensional CAD model data is subsequently retrieved to find information describing a connection method. For example, when a description "member A and member B are to be jointed together by electric welding" is given, it can be determined automatically that the members A and B are jointed (jointed) together by welding. Like the above data, this information is also registered.

Finally, portions that are not inputted as data in the three-dimensional CAD model data but are considered as being jointed in any manner in the phase of actual fabrication are searched automatically and it is decided by the system user whether these portions are joint portions. If they are joint portions, the system user makes a further decision as to what joint method is adopted to clamp them.

Returning to FIG. 2, the above procedures will be described again.

Joint parts are extracted from the profile attribute (name and type of parts) registered in the three-dimensional CAD data and the joint target part, joint position and joint means are identified so as to be registered in the parts joint data 107 in step 203 (joint information identifying unit 106). Namely, in this case, the joint portion is determined almost unconditionally. In this phase, all of sites that are to be jointed by means of parts for joint such as bolt, rivet, screw and the like are extracted.

Figure 10A:
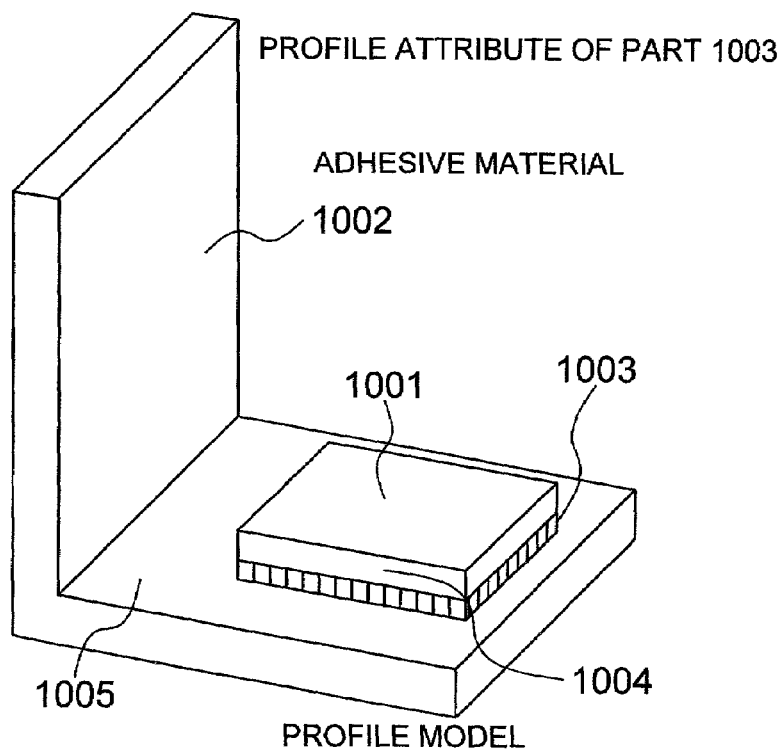
FIGS. 10A and 10B are perspective views showing an example of a method of identifying joint information for an adhesive joint portion.
Figure 10B:
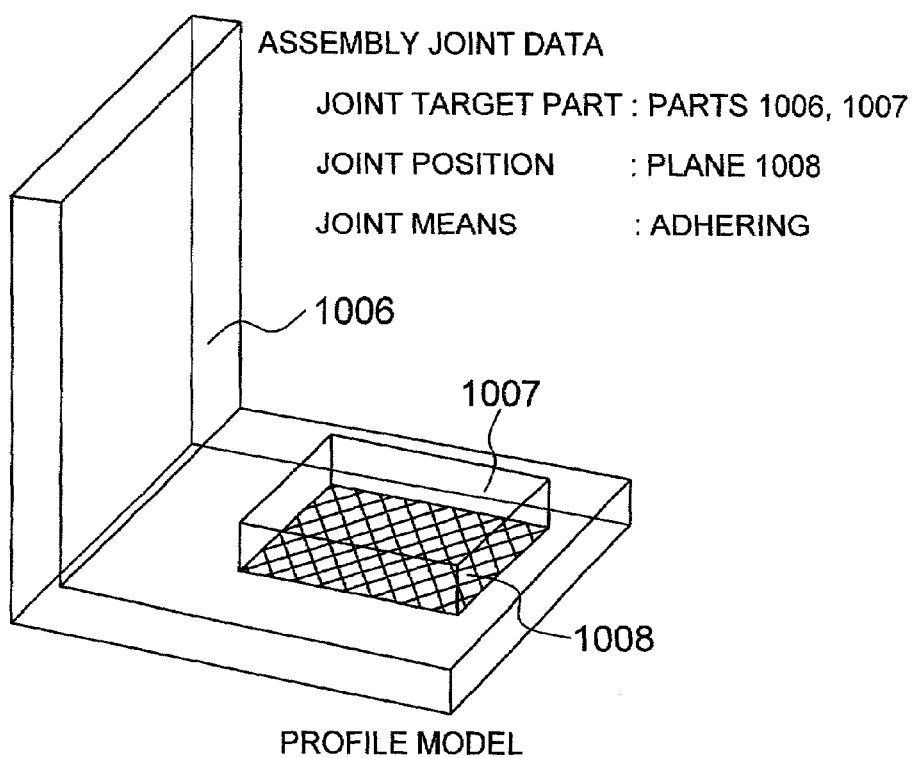

The joint target part, joint position and joint means in the assembly joint data registered in the three-dimensional CAD data are registered in the parts joint data 107. For example, a structure as shown in FIG. 10B is inputted as the assembly joint data registered in the three-dimensional CAD model and describing "part 1006 and part 1007 are jointed at a plane 1008 by adhering". This description is regarded as joint data and because of the joint target part being parts 1006 and 1007, the joint position being the plane 1008 and the joint means being adhering, the parts 1006 and 1007, the plane 1008 and the adhesive joint are stored (registered) at the joint target part 301, joint position 302 and joint means 303, respectively, in the parts joint data 107 in step 204.

Figure 12:
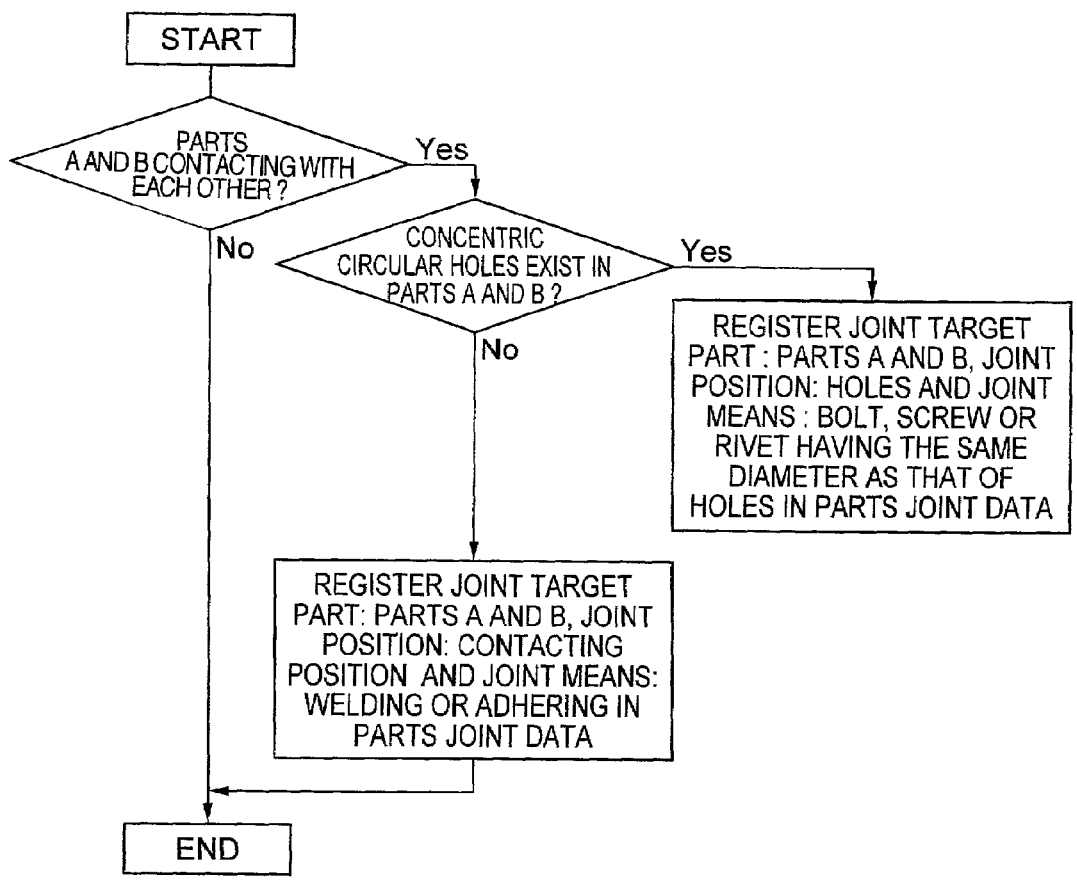
FIG. 12 is a detailed flow chart of step 205 in FIG. 2.

Finally, searching of a joint portion that is not registered as data in the three-dimensional CAD data will be described. The joint target part, joint position and joint member are identified from the geometric information in the three-dimensional CAD data and they are registered in the parts joint data 107 in step 205. A flow chart of this process is shown in FIG. 12.

Firstly, geometrical information about mated parts registered in the three-dimensional CAD data is retrieved to decide whether the mated parts adjoin to each other because, if the mated parts are in contact with each other, then they will often be jointed in any manner to be presented as decision materials of the system user without omission.

In case target parts A and B adjoin to each other and concentric holes are formed in the target parts A and B, it is determined that they are jointed by an unregistered joint part, so that the parts A and B representing the joint target part, the hole representing the joint position and a bolt, screw or rivet having the same diameter as that of the holes and representing the joint means are identified and then, newly registered in the parts joint data 107. Though not shown, for registration of data, the system user may be inquired on the screen whether the hole is for joint and, if for joint, may be inquired what the joint means is.

In case the target parts A and B are merely in contact with each other, the parts A and B representing the joint target part, a portion for mutual contact of the parts A and B representing the joint position and welding or adhering representing the joint means are identified and registered in the parts joint data 107. In this case, the joint means may not be identified definitely to allow the system user to select a joint means from candidates.

Taking the profile model shown in FIG. 10B, for instance, the part 1006 adjoins the part 1007 and therefore, the parts 1006 and 1007 represent the joint target part, the plane 1008 at which these parts adjoin to each other represents the joint position and welding or adhering represents the joint means. The system user selects welding or adhering by using the input/output unit.

The above steps 203 to 205 are in association with the joint information identifying unit.

In step 206, the joint portion is displayed as a highlight (emphatic) display on the input/output unit 101. The highlight display referred to herein signifies that the joint portion is displayed on a display screen 101a in an enlarged form or in a changed color form. By emphatically displaying the joint portion, the system user is allowed to perform confirmation work easily and correct errors with ease.

In step 207, a joint model preparing object corresponding to the parts joint data 107 is retrieved from the joint model preparing object database 112 and a joint model preparing method registered in the joint model preparing object is executed to prepare joint model data which in turn is synthesized with the neutral plane model data 105 (joint model collating unit 108).

Figure 4:
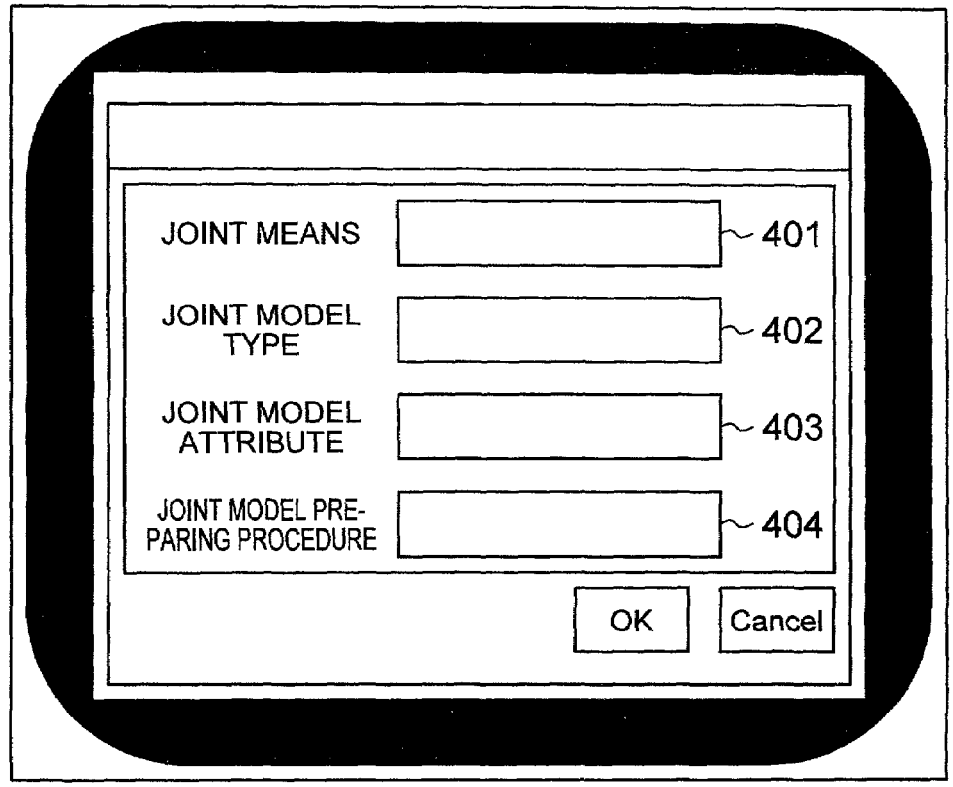
FIG. 4 is a diagram showing an example of input picture of joint model preparing object.

When a plurality of joint model preparing objects corresponding to the parts joint data 107 identified by the joint information identifying unit 106 are registered in the joint model preparing object database 112, applicable one of the joint model preparing objects can be selected. Further, when the joint model preparing object corresponding to the parts joint data 107 identified by the joint information identifying unit 106 is not registered in the joint model generating object database 112 or when a joint model preparing object desired by the system user is not registered in the joint model preparing object database 112, the system user can input the joint model preparing object by using a picture of FIG. 4. A joint means is inputted at 401, a joint model type is inputted at 402, a joint model attribute is inputted at 403 and a joint model preparing procedure is inputted at 404. The joint model preparing object inputted using the picture of FIG. 4 is registered in the joint model preparing object database 112. The joint means inputted at 401, the joint model type inputted at 402, the joint model attribute inputted at 403 and the joint model preparing procedure inputted at 404 are registered at the joint means 310, joint model type 311, joint model attribute 312 and joint model preparing procedure 314, respectively, in the joint model preparing object database 108 (joint pattern registering unit 111). Through the processing in the above six steps, an analytic model containing the joint means can be prepared efficiently.

Figure 11:
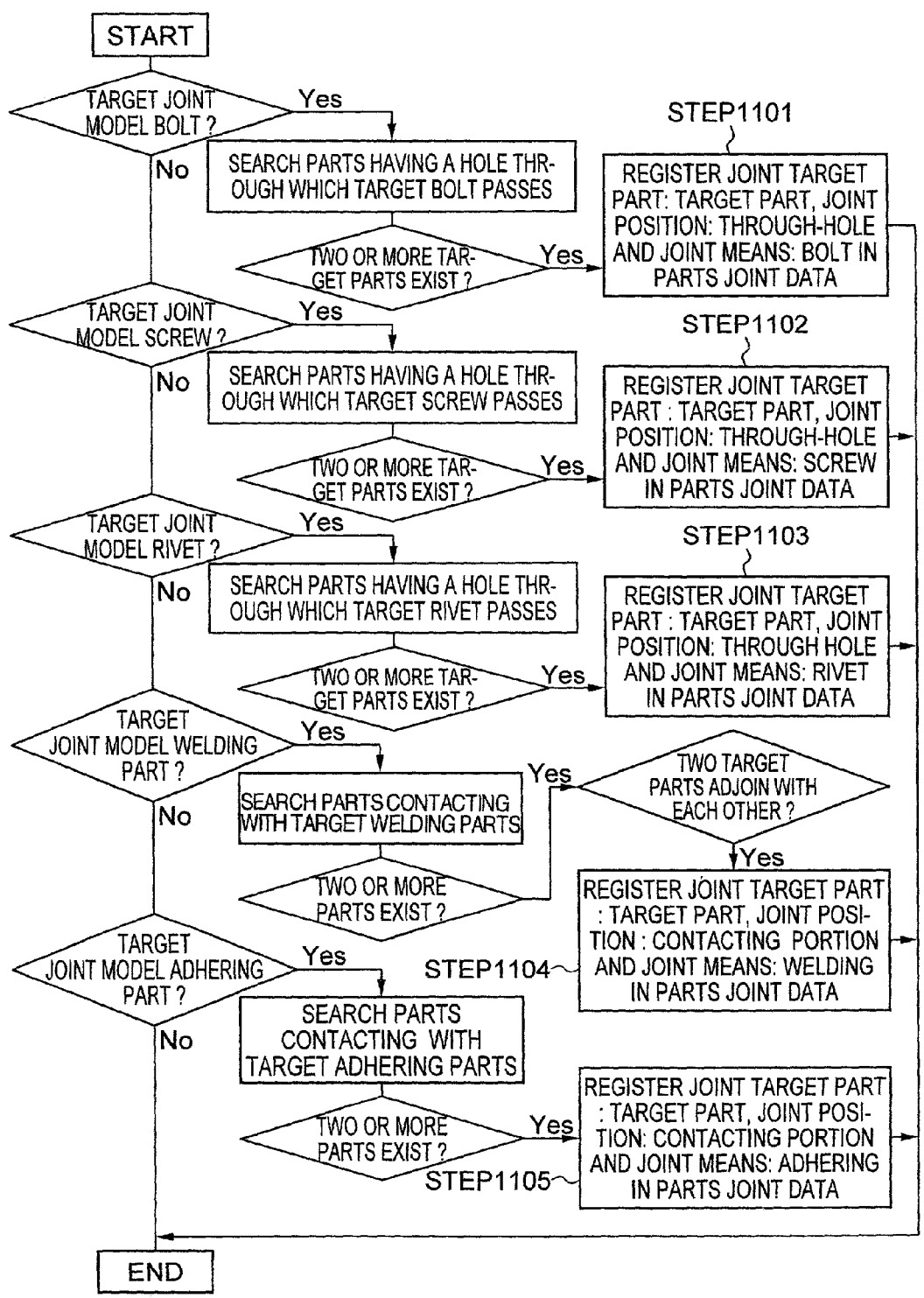
FIG. 11 is a detailed flow chart of step 203 in FIG. 2.

Next, an example of detailed processing procedure in the step 203 in the joint information identifying unit 106 will be described with reference to a flow chart shown in FIG. 11.

In case the target joint part is a bolt, parts having a hole through which the target bolt passes are searched and if the number of target parts is two or more, the target parts, the through-hole and the target bolt are registered at the joint target part 301, joint position 302 and joint means 303, respectively, in the parts joint data 107. Taking an assembly profile shown in FIGS. 6A to 6D, for instance, there are parts 601 and 602 having holes 604 and 605 through which a bolt 603 passes and therefore, the parts 601 and 602, the holes 604 and 605 and the bolt 603 are registered at the joint target part 301, joint position 302 and joint means 303, respectively, in the parts joint data 107 in step 1101.

Figure 7B:
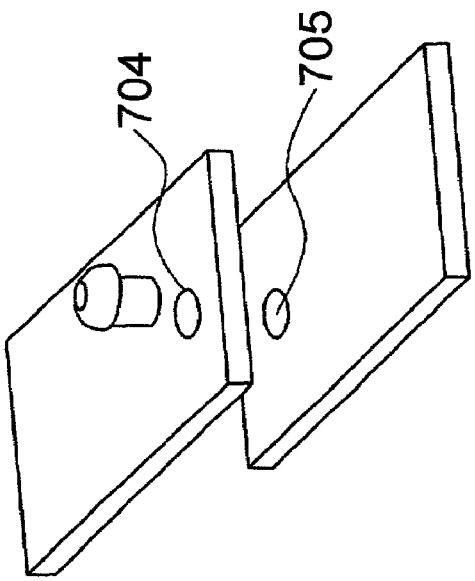
FIGS. 7A and 7B are perspective views showing an example of a method of identifying joint information for a screw joint portion.
Figure 7A:
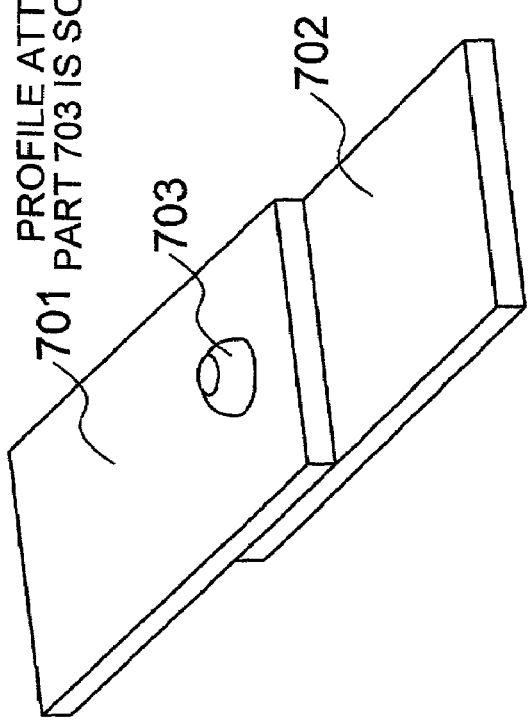

In case the target joint part is a screw, parts having holes through which the target screw passes are searched and if the number of target parts is two or more, the target parts, the through-hole and the target screw are registered at the joint target part 301, joint position 302 and joint means 303, respectively, in the parts joint data 107. Taking an assembly profile of FIGS. 7A and 7B, for instance, there are parts 701 and 702 having holes 704 and 705 through which a screw 703 passes and therefore, the parts 701 and 702, the holes 704 and 705 and the screw 703 are registered at the joint target part 301, joint position 302 and joint means 303, respectively, in the parts joint data 107 in step 1102.

Figure 8A:
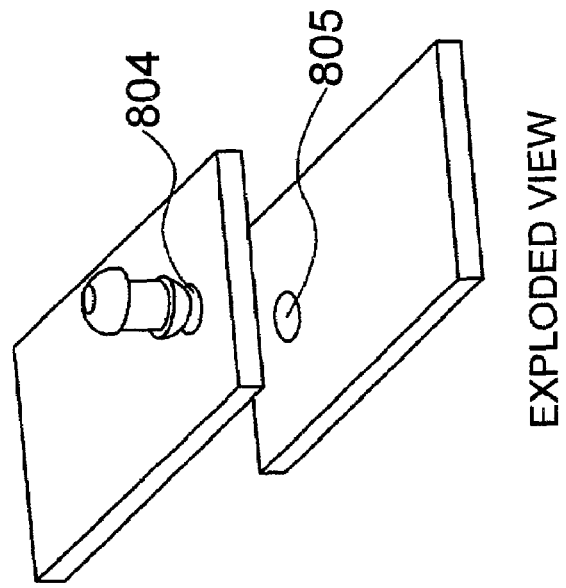
FIGS. 8A and 8B are perspective views showing an example of a method of identifying joint information for a rivet joint portion.
Figure 8B:
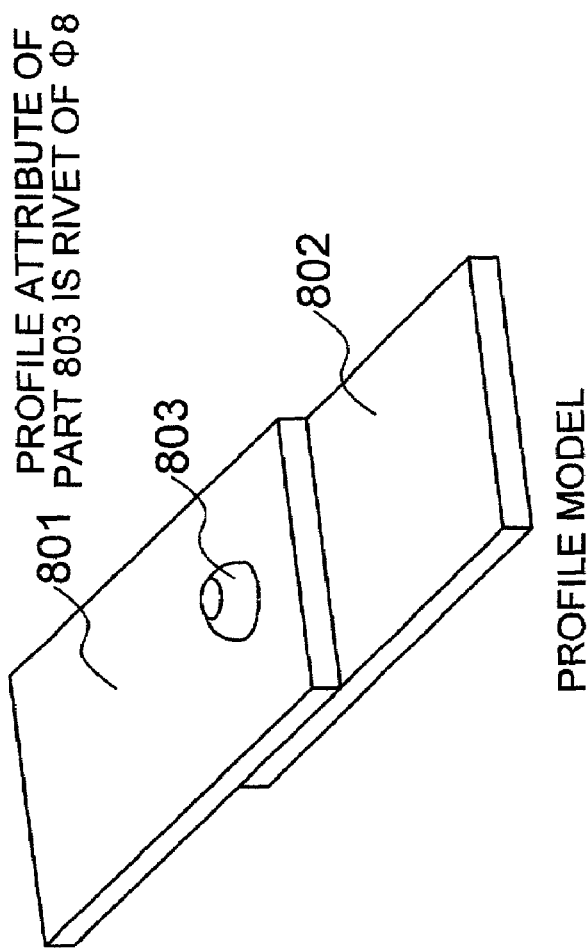

In the case of the target joint part being a rivet, parts having holes through which the target rivet passes are searched and if the number of target parts is two or more, the object parts, the through-holes and the target rivet are registered at the joint target art 301, joint position 302 and joint means 303, respectively, in the parts joint data 107. Taking an assembly profile of FIGS. 8A and 8B, for instance, there are parts 801 and 802 having holes 804 and 805 through which a rivet 803 passes and therefore, the parts 801 and 802, the holes 804 and 805 and the rivet 803 are registered at the joint target part 301, joint position 302 and joint means 303, respectively, in the parts joint data 107 in step 1103.

Figure 9:
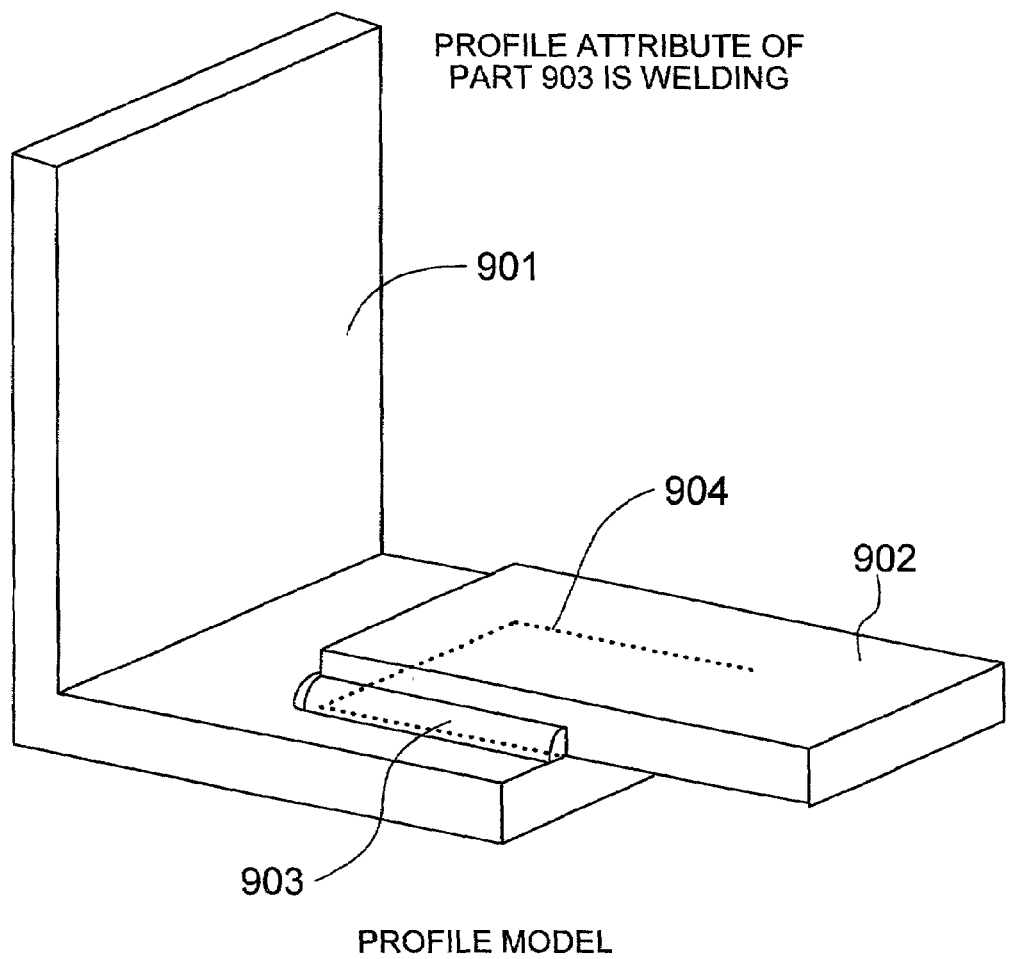
FIG. 9 is a perspective view showing an example of a method of identifying joint information for a welding joint portion.

If, in the case of the target joint means being welding, two parts contacting with a target welding part exist and the two target parts are in contact with each other, the two target parts, a portion where the welding part contacts with the two target parts and the target welding part are registered at the joint target part 301, joint position 302 and joint means 303, respectively, in the parts joint data 107. For example, in an assembly profile of FIG. 9, a welding part 903 contacts with parts 901 and 902 and the parts 901 and 902 are in contact with each other and therefore, the parts 901 and 902, a portion 904 where the parts 901 and 902 are in contact with each other and the welding part 903 are registered at the joint target part 301, joint position 302 and joint means 303, respectively, in the parts joint data 107 in step 1104.

If, in the case of the target joint means being adhesion, there are two parts making contact with a target adhering part, the two target parts, a plane where the adhering part contacts with the two target parts and the target adhering part are registered at the joint target part 301, joint position 302 and joint means 303, respectively, in the parts joint data 107. For example, in an assembly profile of FIG. 10A, an adhesive part 1003 contacts with parts 1001 and 1002 and therefore, the parts 1001 and 1002, planes 1004 and 1005 where the adhesive part 1003 contacts with the parts 1001 and 1002 and the adhesive part 1003 are registered at the joint target part 301, joint position 302 and joint means 303, respectively, in the parts joint data 107 in step 1105.

Next, the joint model preparing object database 112 will be described. An example will be described in which as a joint model preparing object corresponding to the joint means 603 (bolt) of CAD model shown in FIG. 6A, data and method as below are registered.

Joint means: bolt of M8

Joint model type: beam element

Joint model attribute: beam element having a 2 mm diameter columnar form and being made of a material of steel Joint model preparing procedure: preparation of beam elements for connecting points quartering holes at a joint position In this instance, beam elements 610 to 613 for connecting points quartering holes 608 and 609 on neutral planes 606 and 607 corresponding to the holes 604 and 605 are prepared and an attribute prescribing a columnar form of 2 mm diameter and a material of steel is given to each of the beam elements 610 to 613. In a neutral plane model shown in FIG. 6C, the neutral planes 606 and 607 are not jointed mutually from the viewpoint of a model. In jointing the two neutral planes, the strength of the joint means is taken into account and four beam elements (line segments) 610 to 613 are used to connect the holes 608 and 609. During analysis, these holes are mutually connected by the beam elements and behave as in the case of joint.

The aforementioned software can be stored in a storage medium such as CDROM, floppy disk or DVDROM so as to be offered to the user possessing the analytic apparatus. Alternatively, the software may be stored in a server or a hard disk device so as to be distributed to the user possessing the analytic apparatus through a network line such as Internet. The program lacks the display function and in this case, has the function of delivering a signal (for example, the emphatic display signal) to the display unit.

Next, an example will be described in which an analytic model of a joint portion is prepared according to the aforementioned analytic model preparing program by using an actual profile model.

Figure 5A:
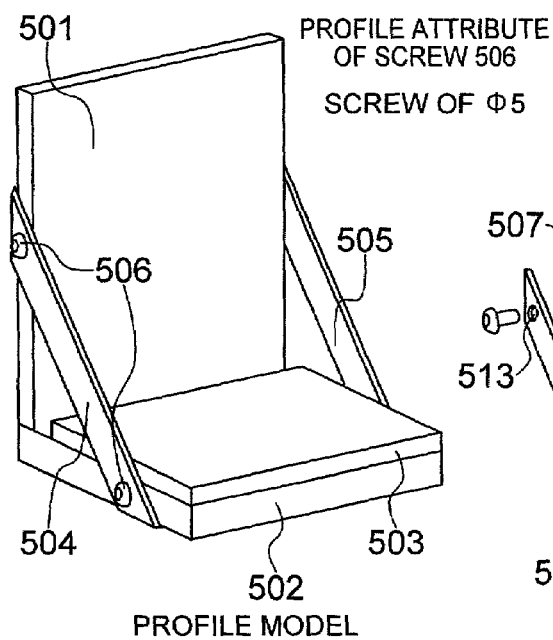
FIGS. 5A, 5B, 5C and 5D are perspective views showing an example of analytic model preparation according to the invention.
Figure 5B:
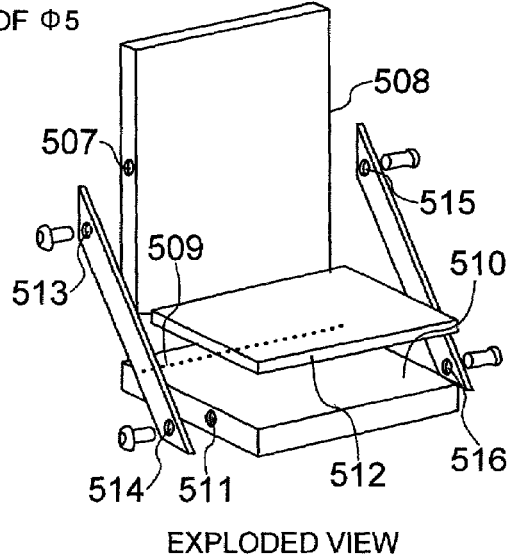

More particularly, the preparation of an analytic model including a joint means will be exemplified in respect of a profile model of an analytic object shown in FIG. 5A. FIG. 5B is an exploded view of FIG. 5A. The profile model of FIG. 5A consists of five parts 501, 502, 503, 504 and 505 and four screws 506 and assumptively, the following data is registered as assembly joint information data.

Part 501–part 502: jointed by welding at part 509

Part 502–part 503: jointed by adhering at plane 512 (a plane opposing plane 510)

Figure 5C:
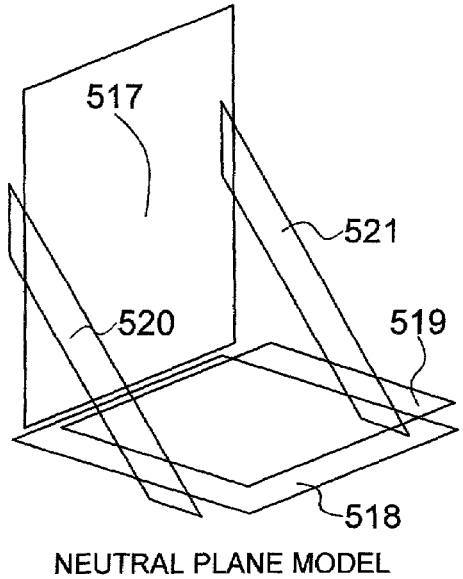

An example of a neutral plane model prepared in respect of the profile model of FIG. 5A by the neutral plane model preparing unit 104 is illustrated in FIG. 5C. A neutral plane 517 corresponding to the part 501, a neutral plane 518 corresponding to the part 502, a neutral plane 519 corresponding to the part 503, a neutral plane 520 corresponding to the part 504 and a neutral plane 521 corresponding to the part 505 are prepared.

Next, in the joint information identifying unit 106, the contents of the joint target part, joint position and joint means are identified. More particularly, from the assembly joint data indicating that the parts 501 and 502 are jointed at the part 509 by welding, the joint target part is identified as part 501 and part 502, the joint position is identified as part 509 and the joint means is identified as welding. From the assembly joint data indicating that the parts 502 and 503 are jointed at the plane 512 by adhering, the joint target part is identified as part 502 and part 503, the joint position is identified as plane 512 and the joint means is identified as adhering. Since the parts 501 and 504 respectively have holes 507 and 513 through which a screw 506 passes, the joint target part is identified as part 501 and part 504, the joint position is identified as hole 507 and hole 513, and the joint means is identified as screw 506. For the parts 504 and 502, the parts 505 and 501 and the parts 505 and 502, the content of joint target part, the content of joint position and the content of joint means are identified in a manner similar to the above.

The thus identified contents of the joint target part, joint position and joint means are registered as parts joint data. The parts joint data is given as shown in Table 1.

TABLE 1

PARTS JOINT DATA

| JOINT TARGET PARTS | JOINT POSITION | JOINT MEANS |
|---|---|---|
| PART 501–PART 502 | 509 | WELDING |
| PART 502–PART 503 | PLANE 512 | ADHERING |
| PART 501– | HOLE 507 | SCREW OF φ5 |
| PART 504 | HOLE 514 | |
| PART 501– | HOLE 508 | SCREW OF φ5 |

TABLE 1-continued

PARTS JOINT DATA

| JOINT TARGET PARTS | JOINT POSITION | JOINT MEANS |
|---|---|---|
| PART 505 | HOLE 515 | |
| PART 502– PART 504 | HOLE 511 HOLE 514 | SCREW OF φ5 |
| PART 502– PART 505 | HOLE 516 HOLE 510 | SCREW OF φ5 |

Next, on the basis of the parts joint data obtained through the above process, a joint model is prepared. An example is taken in which data as shown in Table 2 is registered in the joint model preparing object database 108.

TABLE 2

EXAMPLE OF JOINT MODEL PREPARING OBJECT DATABASE

| No. | JOINT MEANS | JOINT MODEL TYPE | JOINT MODEL ATTRIBUTE | JOINT MODEL PREPARING PROCEDURE |
|---|---|---|---|---|
| 21 | WELDING JOINT | PLANE JOINT | THICKNESS: 2 mm MATERIAL: STEEL | Prepare plane for connecting joint positions |
| 22 | ADHESIVE JOINT | TYING JOINT | — | Jointed by tying 16 points obtained by dividing joint position to 16 equal parts |
| 23 | φ5 SCREW | BEAM ELEMENT JOINT | 5 mm DIAMETER COLUMNAR FORM MATERIAL: STEEL | Prepare beam elements for connecting central points of holes at joint position |
| 24 | φ5 SCREW | BEAM ELEMENT JOINT | 2.5 mm DIAMETER COLUMNAR FORM MATERIAL: STEEL | Prepare 2 beam elements for connecting holes at joint position |

Since the joint means for the parts 501 and 502 is welding, a joint model preparing object in which welding is registered at the joint means is retrieved from the joint model preparing object database. In this case, No. 21 joint model preparing object is selected, indicating that the joint model type is plane joint, the joint model attribute is indicative of a 2 mm thickness and a material of steel and the joint model preparing procedure prescribes "a plane for connecting joint positions is to be prepared" and hence, a joint model 522 is prepared and the joint model attribute is given which indicates that the thickness is 2 mm and the material is steel.

Since the joint means for the parts 502 and 503 is adhering, a joint model object in which adhering is registered at the joint means is retrieved from the joint model preparing object database. In this case, No. 22 joint model preparing object is selected, indicating that the joint model type is tying joint and the joint model preparing procedure prescribes "sixteen points obtained by dividing the joint position into sixteen equal parts are to be mutually coupled by tying" and therefore, a joint model 523 is prepared.

The joint means for the parts 504 and 501 is a screw of φ5 and accordingly, a joint model preparing object in which the φ5 screw is registered at the joint means is retrieved from the joint model preparing object database. In this case, either No. 23 or No. 24 joint model preparing object is targeted and the user selects any one. Assumptively, No. 23 joint model object is selected herein.

Accordingly, the joint model type is beam element joint, the joint model attribute is indicative of a 5 mm-diameter columnar form and a material of steel and the joint model preparing procedure prescribes "beam elements for connecting central points of holes at the joint position are to be prepared", so that a joint model 524 is prepared and the joint model attribute indicating that the columnar form has a diameter 5 mm and the material is steel is given.

For the parts 501 and 505, parts 502 and 504 and parts 502 and 505, the joint means is also the 5 φ screw and therefore, either No. 23 or No. 24 applicable joint model preparing object is selected. Assumptively, No. 23 joint model preparing object is herein selected for the parts 501 and 505 and No. 24 joint model preparing object is selected for the parts 502 and 504 as well as the parts 502 and 505.

Figure 5D:
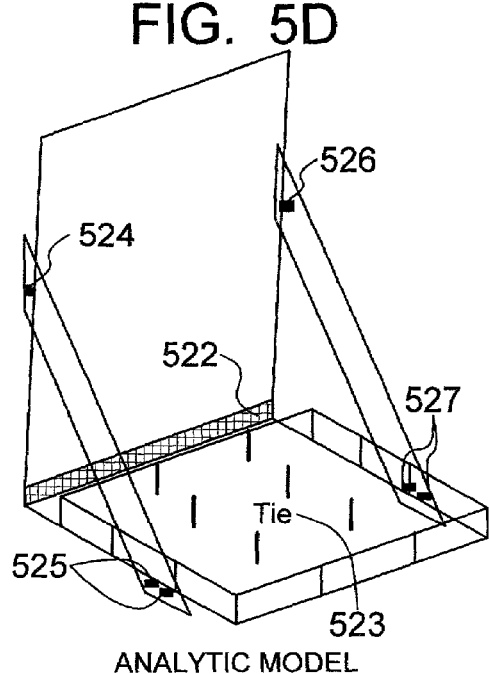
Figure 6A:
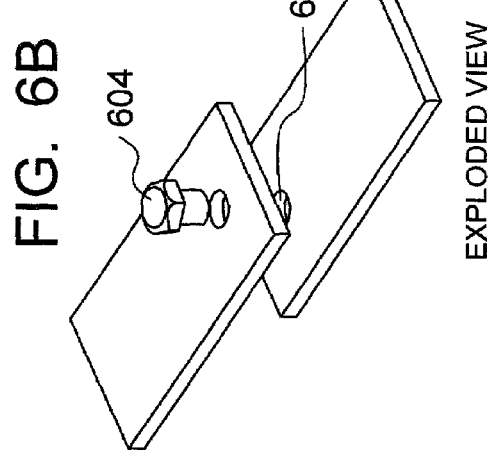
FIGS. 6A, 6B, 6C and 6D are perspective views showing an example of a method of identifying joint information for a bolt joint portion.
Figure 6B:
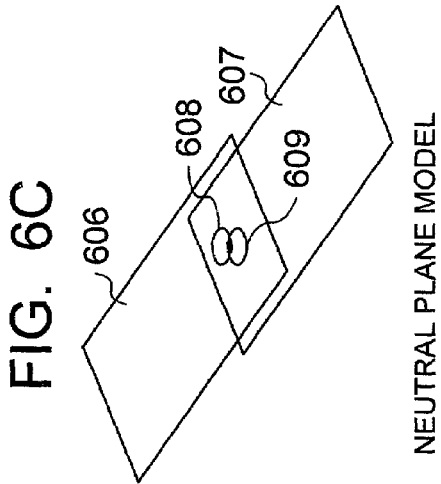
Figure 6C:
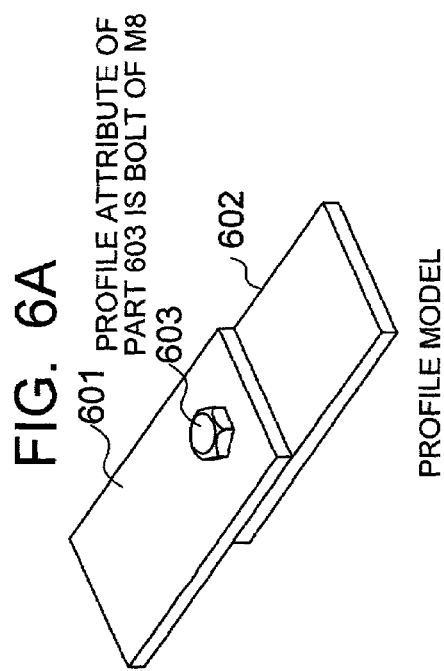
Figure 6D:
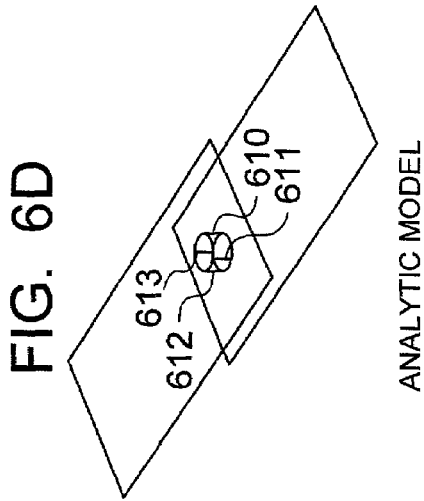

Thus, joint models 525, 526 and 527 are prepared. Finally, the joint models prepared through the above process and the neutral plane model of FIG. 5C are synthesized to prepare an analytic model of FIG. 5D.

As described above, according to the present embodiment, depending on the amounts of information in the three-dimensional CAD data, the joint portions can automatically be searched from the profile model representing an analytic object and can be drawn up into an analytic model, thereby alleviating the load imposed on the system user.

Further, since the searched joint portions or candidates for joint portions can be displayed emphatically, laborious searching required of the system user can be reduced and the system user can manually perform analytic modeling highly conveniently.

According to the present invention, an analytic model preparing apparatus capable of preparing an analytic model efficiently in respect of a profile model including joint portions can be provided and storage medium and storage apparatus storing an analytic model preparing program can be provided.

What is claimed is:

1. An analytic model preparing apparatus for automatically preparing an analytic model for numerical analysis in respect of a CAD model including a joint means, comprising:
    means for inputting, as the CAD model, profile data and a profile attribute of an object to be analyzed;
    means for automatically searching a part of laminate structure from said CAD model to prepare a neutral plane model;
    means for extracting a joint target part, a joint position and a joint means from said CAD model;
    means for registering said extracted joint target part, joint position and joint means as parts joint data;
    means for retrieving a joint model preparing object corresponding to said joint means registered in said parts joint data from a joint model preparing object database;
    means for executing a joint model preparing process registered in said joint model preparing object to prepare a joint model;
    means for synthesizing said joint model and said neutral plane model to prepare an analytic model corresponding to said laminate structure; means for performing numerical analysis on said analytic model; and displaying said laminate structure.

2. An analytic model preparing apparatus according to claim 1, wherein as said joint model preparing object, said joint means, the joint model type, joint model attribute and joint model preparing procedure are registered in said joint model preparing object database.

3. An analytic model preparing apparatus according to claim 1, further comprising means for registering said joint target part, joint position and joint means in a three-dimensional CAD model as assembly joint data, and means for registering said joint target part, said joint position and said joint means as parts joint data.

4. An analytic model preparing apparatus according to claim 1, further comprising means for emphatically displaying a joint position identified from said CAD model on an input/output unit.

* * * * *